(12) United States Patent
Manjeshwar et al.

(10) Patent No.: US 7,756,310 B2
(45) Date of Patent: Jul. 13, 2010

(54) SYSTEM AND METHOD FOR SEGMENTATION

(75) Inventors: Ravindra Mohan Manjeshwar, Guilderland, NY (US); James Vradenburg Miller, Clifton Park, NY (US); Thomas Baby Sebastian, Flemington, NJ (US)

(73) Assignee: General Electric Company, Niskayuna, NY (US)

( * ) Notice: Subject to any disclaimer, the term of this patent is extended or adjusted under 35 U.S.C. 154(b) by 937 days.

(21) Appl. No.: 11/531,882

(22) Filed: Sep. 14, 2006

(65) Prior Publication Data

US 2008/0069414 A1 Mar. 20, 2008

(51) Int. Cl.
*G06K 9/00* (2006.01)
(52) U.S. Cl. ............... 382/128; 382/173; 382/131; 382/132; 382/276; 348/441; 348/442
(58) Field of Classification Search ............... 382/100, 382/103, 128–132, 134, 162, 164, 168, 171–172, 382/173, 181, 190, 195, 254, 256–259, 270, 382/276, 282, 283, 286, 291; 348/169, 441–449, 348/403, 468
See application file for complete search history.

(56) References Cited

U.S. PATENT DOCUMENTS 6,249,594 B1 * 6/2001 Hibbard ............... 382/128
7,006,677 B2 2/2006 Manjeshwar et al.
2001/0031920 A1 * 10/2001 Kaufman et al. ............ 600/431
2004/0228529 A1 11/2004 Jerebko et al.
2006/0050958 A1 * 3/2006 Okada et al. ............... 382/173

OTHER PUBLICATIONS

Cheng,"Mean Shift, Mode Seeking, and Clustering", Aug. 1995, IEEE Transactions on Pattern Analysis and Machine Intelligence, vol. 17, No. 8.*

Erdi Y., Mawlawi O., Larson S., Imbriaco M., Yeung H., Finn R., Humm J, "Segmentation of Lung Lesion Volume by Adaptive Positron Emission Tomography Image Thresholding", Cancer 80, No. 12, Dec. 15, 1997, pp. 2505-2509.

* cited by examiner

*Primary Examiner*—Andrew W Johns
*Assistant Examiner*—Jason Heidemann
(74) *Attorney, Agent, or Firm*—Scott J. Asmus (57) ABSTRACT

A method and system for segmenting structures such as lesions in an image is provided. The method comprises selecting one seed inside a lesion in an image either by a user or automatically. The method further includes deriving a directionally statistical model based on a background region or a foreground region of the lesion and determining candidate voxels along a radial direction. The candidate voxels represent the lesion. The method further includes segmenting the lesion using the candidate voxels.

26 Claims, 5 Drawing Sheets

SYSTEM AND METHOD FOR SEGMENTATION

BACKGROUND

The invention relates generally to imaging systems and more specifically to a system and method for segmentation lesions in medical images.

In many imaging systems such as computed tomography systems, for example, cross-sectional images or slices are made by an X-ray system, which are used for diagnosis. In positron emission tomography (PET) systems, for example, the patient is commonly injected with a biologically active radioactive tracer. The radioactive decay of the tracer emits a positron that annihilates with electrons in the body of the patient. This annihilation produces two high energy (about 511 KeV) photons propagating in nearly opposite directions (about 180 degrees apart) that are in coincidence. A detector and a computer system are used together for creating detailed images of a patient's organs and other body parts. The imaging capabilities are physically similar to those of X-ray systems, magnetic resonance imaging (MRI) systems, ultrasound systems, positron emission tomography (PET) systems, and other modalities similarly adapted to imaging certain tissues or anatomies.

The images generated by the imaging system are analyzed using imaging algorithms and pathologies of concern are highlighted which are then reviewed by radiologists for final diagnosis. As can be appreciated by those skilled in the art, certain subsequent imaging procedures may become feasible or may be recognized as desirable due to the improved management of data volume.

The images are typically analyzed for multiple features. For example, in oncology applications, the image is analyzed to locate and delineate lesions or tumors. Successful radiation therapy depends upon accurate delivery of a prescribed dose to the tumor while sparing as much as possible of the adjacent healthy tissue. The analysis of the images can be performed by various imaging techniques such as employing a segmentation scheme that quickly and accurately delineates tumor boundaries.

In most imaging systems employing segmentation schemes, experienced nuclear medicine physicians perform the tumor delineation manually. Such schemes are challenging for physicians due to small tumor sizes, blurred boundaries, inhomogeneous lesions and regions near to the lesion with similar image characteristics to the lesion. In addition, the method is time consuming and is a subjective process that is susceptible to fairly large inter and intra operator variations. Other segmentation schemes have been based primarily on determining a global threshold either manually or using data-driven classification. These methods, however, are not suitable to segment lesions that are located adjacent to other regions of high uptake and are sensitive to the dynamic range of the data.

Therefore, there is a need for developing a segmentation scheme that accurately identifies and delineates lesion boundaries in images in a robust and repeatable manner.

BRIEF DESCRIPTION

Briefly, in accordance with one embodiment of the invention, a method for segmenting structures in an image is provided. The method comprises selecting one seed inside a structure; wherein the selecting is performed by a user, deriving a directionally dependent statistical model of the image to identify a region relative to the structure in the image and determining candidate voxels along a radial direction, wherein the candidate voxels represent the structure. The method further includes segmenting the structure using the candidate voxels.

In another embodiment, an imaging system for segmenting structure in an image is provided. The imaging system comprises a user interface for enabling a user to select a seed inside the structure and an image processor adapted to implement an image processing algorithm. The image processing algorithm is configured to derive a directionally dependent statistical model of the image to identify a region relative to the structure in the image, determine candidate voxels along a radial direction, wherein the candidate voxels represent the structure and segment the structure using the candidate voxels.

In an alternate embodiment, an imaging system for segmenting structures in an image is provided. The system comprises an image processor adapted to implement an image processing algorithm configured to automatically select a seed inside the structure, derive a directionally dependent statistical model of the image to identify a region relative to the structure in the image and determine candidate voxels along a radial direction from location of the seed, wherein the candidate voxels represent the structure. The image processor is further configured to segment the structure using the candidate voxels.

In yet another embodiment, an imaging system for segmenting structures in an image is provided. The imaging system comprises means for selecting one seed inside the structure; wherein the selecting is performed by a user, means for deriving a directionally dependent statistical model of the image to identify a region relative to the structure in the image, means for determining candidate voxels along a radial direction, wherein the candidate voxels represent the structures and means for segmenting the structures using the candidate voxels.

DRAWINGS

These and other features, aspects, and advantages of the present invention will become better understood when the following detailed description is read with reference to the accompanying drawings in which like characters represent like parts throughout the drawings, wherein.

DETAILED DESCRIPTION

The described embodiments are generally directed towards an imaging system, which may be used in clinical applications. Such systems may include, without limitation, positron emission tomography (PET) systems, computed tomography (CT) systems, a single photon emission computed tomography system, magnetic resonance imaging systems, digital radiography image, microscopy imagery systems and so forth, and generally provide useful two-dimensional and three-dimensional images. To facilitate explanation, however, PET system implementations will be generally discussed herein, though it is to be understood that other implementations are also within the scope of the present invention.

Figure 1:
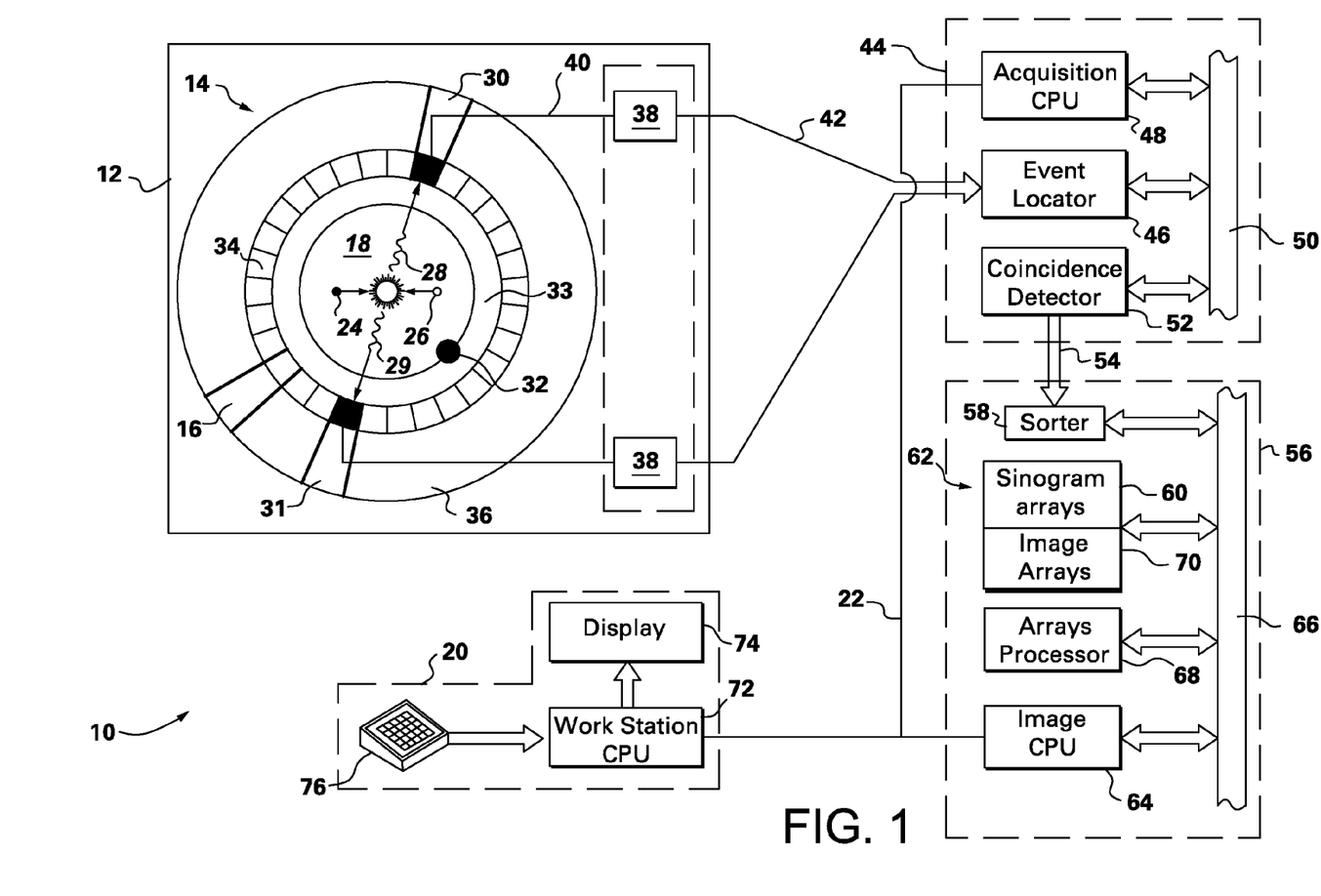
FIG. 1 is an exemplary PET imaging system for volumetric imaging using an image processor in which aspects of the present technique may be practiced.

Referring now to FIG. 1, an imaging system 10 is illustrated for acquiring and processing image data. In the illustrated embodiment, the imaging system 10 is a PET system designed both to acquire original image data and to process the image data for display and analysis in accordance with the present technique. The PET imaging system 10 is illustrated with a gantry 12 that supports a cylindrical detector ring assembly 14, comprising of an array of detectors 16 (detector units), about a central aperture (imaging volume) 18. The detectors 16 may be shielded from radiation from outside the filed of view by lead end-shields. The detector ring assembly 14 generally forms a complete ring about the imaging volume 18.

A patient table may be positioned within the aperture 18 of the PET system 10. The patient table is adapted so that a patient may recline comfortably during the examination process. A patient table controller (not shown) moves the patient table into the imaging volume 18 in response to commands received from an operator workstation 20 through a communication link 22 such as a local area network (LAN). Additionally, a gantry controller (not shown) may be configured to receive commands from the operator workstation 20 through the communication link 22 to operate the gantry 12.

The patient is commonly injected with a biologically active radioactive tracer. This radioactive substance has two parts called a carrier such as glucose, which concentrates in parts of the body with increased metabolic activity, and the radionuclide, which emits a positron 24. Since positron 24 emitting isotopes of carbon, nitrogen, oxygen, and fluorine can be created and these atoms occur naturally in many compounds of biological interest, these radionuclides can therefore be readily incorporated into a wide variety of useful radio-pharmaceuticals. The type of tracer a patient receives depends on which area of the body is to be viewed. The most commonly used tracers are radiolabeled glucose, ammonia, and water, all of which are found in the human body. As the tracers are short-lived, the radiation exposure a patient receives is small. The tracer is allowed to dwell in the patient for a time such that its distribution is determined by the biological function to be imaged.

The radioactive decay of the tracer emits a positron 24 that annihilates with electrons 26 in the body of the patient. This annihilation produces two high energy (about 511 KeV) photons 28, 29 propagating in nearly opposite directions (about 180 degrees apart) that are in coincidence. These photons 28, 29 are detected by the detector ring assembly 14 surrounding the patient. When a detector 30 detects a photon 28 from an annihilation event, the detector 31 opposite it looks for a matching photon 29; and if two matching photons 28, 29 are recorded within nanoseconds of each other i.e. within a short timing window (also referred to as a coincidence timing window), the detectors 30, 31 register a coincidence event (called a true coincidence if neither photon 28, 29 is scattered) along the line connecting the two detectors 30, 31 also known as a line of response.

The PET system 10 may then draw lines of responses between each detector pair such as those indicated by reference numeral 30 and 31 registering a coincidence event during a scan. Summing many such events results in quantities that approximate line integrals through the radioisotope distribution. The higher the number of coincidences detected, the more precise this calculation will be. The PET system 10 then uses this information to construct an image of the radioisotope distribution, using algorithms similar to those applied in CT, MR and nuclear medicine, thereby yielding quantitative estimates of the concentration of the radiopharmaceuticals at specific locations within the body. The reconstructed images are cross-sectional slices that highlight areas of biochemical activity. While other diagnostic tests, such as x-rays, CT scans, MR scans or ultrasound, provide cross-sectional images of the body structure showing bones, tissue and organs, the PET scan can provide images of physiological activity giving information on the chemistry and function of the area under examination.

As illustrated in FIG. 1, each detector ring of the detector ring assembly 14 may comprise of a rod source 32 used for attenuation correction, a septa 33 used for scatter reduction, and a plurality of detector units 16 consisting of scintillator elements 34 and photomultiplier tubes 36 (PMTs). In another embodiment, the rod source used to generate data for attenuation correction may be replaced by data from a CT scanner. A plurality of acquisition circuits 38 may receive analog signals 40 from the detector units 16 and produce digital signals 42 indicating the event coordinates and the total energy. Each acquisition circuit 38 may also produce an event detection pulse, which indicates the moment the scintillation event took place. The digital signals 42 from the acquisition circuits 38 are then processed by a data acquisition system 44 (DAS).

The data acquisition system 44 may include an event locator 46 that periodically samples the digital signals 42 produced by the acquisition circuits 38. The data acquisition system 44 also includes an acquisition processor 48 that controls the communication link 22 and a data bus 50 (backplane bus). The event locator 46 may assemble the information regarding each valid event into an event data packet that indicates when the event took place and the position of the detector 16 that detected the event. This event data pack is conveyed to a coincidence detector 52, which may be a part of the data acquisition system 44.

The coincidence detector 52 may receive the event data packets from the event locators 46 and determine if any two of them are in coincidence. Coincidence is determined by a number of factors. First, the time markers in each event data packets may be within a specified time window of each other. Second, the energies of the detected photons lie within a specified range so as to reject scattered coincidences. Third, the locations indicated by the two event data packets may lie between a pair of detectors, such as those indicated by reference numeral 30 and 31, which may have a line of response that passes through the field of view in the imaging volume 18. Events that cannot be paired as such are discarded, but coincident event pairs are located and recorded as a coincidence data packet that is conveyed through a serial link 54 to an image reconstructor 56.

The image reconstructor 56 may include a sorter 58 that counts events occurring along each projection ray and organizes them into a series of two-dimensional sinogram array 60 that may be stored in a memory module 62. The series of two-dimensional sinogram arrays may consist of data from planes that are both perpendicular and oblique to the central axis of the scanner. When a PET scanner is operated in 2D mode, only the perpendicular sinogram planes are collected. When the scanner is operated in the 3D mode, both perpendicular and oblique sinogram planes are collected. The image reconstructor 56 also includes an image processor 64 that controls a data bus 66 and links the image reconstructor 56 to the communication link 22. An array processor 68 also connects to the data bus 66 and it may reconstruct images from the sinogram arrays 60. The image reconstructor performs mathematical operations on the sinogram arrays to convert them into a series of two-dimensional images. The mathematical operations performed are called reconstruction algorithms. The reconstruction algorithms employed to generate the images may be either analytical algorithms (like Filtered-back-projection reconstruction) or statistical iterative algorithms (like Maximum Likelihood Expectation Maximization, Ordered Subsets Expectation Maximization, Penalized Likelihood algorithms etc). The choice of the image reconstruction algorithm applied effects the resolution and noise properties of the resulting images. The resulting series of images 70 may be stored in the memory module 62 and output by the processor 64 to the operator workstation 20.

The operator workstation 20 may include a workstation processor 72, a display unit 74 and an input device 76. The PET image may be displayed on the display unit 74 where the operator or a user such as a radiologist examines the image for structures such as lesions and then selects a seed within the image. The structure can then be segmented by applying an image processing algorithm. The image processing algorithm is configured to derive a directionally dependent statistical model on the image which will be described in greater detail below with reference to FIG. 2 and 3. The image processing algorithm is implemented in image processor 64.

The workstation processor 72 may connect to the communication link 22. The operator may control the calibration of the PET scanner 10, its configuration, positioning of the patient table for a scan and the gantry 12 through operator workstation 20. The operator may also control the display of the resulting image on the display unit 74 and perform image enhancement functions using programs executed by the workstation processor 72. It should be noted that the operator workstation 20 may be coupled to other output devices such as printers, standard or special purpose computer monitors, associated processing circuitry or the like. One or more operator workstations 20 may be further linked in the imaging system 10 for outputting system parameters, requesting examinations, viewing images, and so forth.

As discussed in FIG. 1, the structure is segmented using a directionally dependent statistical model. As used herein, a structure refers to lesions, tumors, etc. To facilitate explanation, however, lesions will be generally discussed herein, though it is to be understood that structures such as tumors are within the scope of the present invention.

Figure 2:
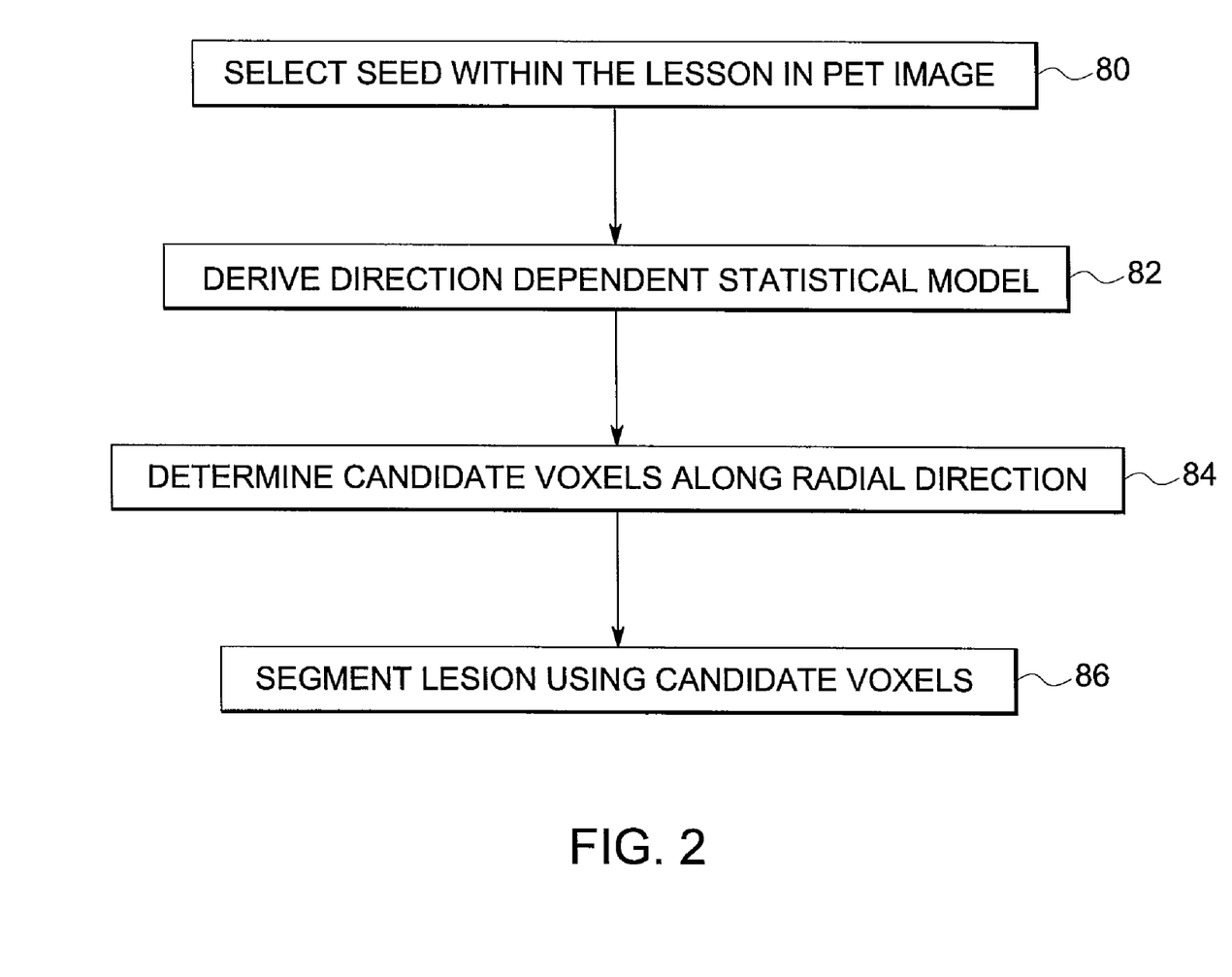
FIG. 2 is a flow chart illustrating a method for segmenting lesions in a positron emission tomography (PET) image implemented according to one aspect of the invention.

FIG. 2 is a flow chart illustrating one method by which structures are segmented in a three-dimensional PET image. However, it is to be understood that the techniques described below can be applied to two-dimensional images as well. Each step in the flow chart is described in further detail below.

Figure 3:
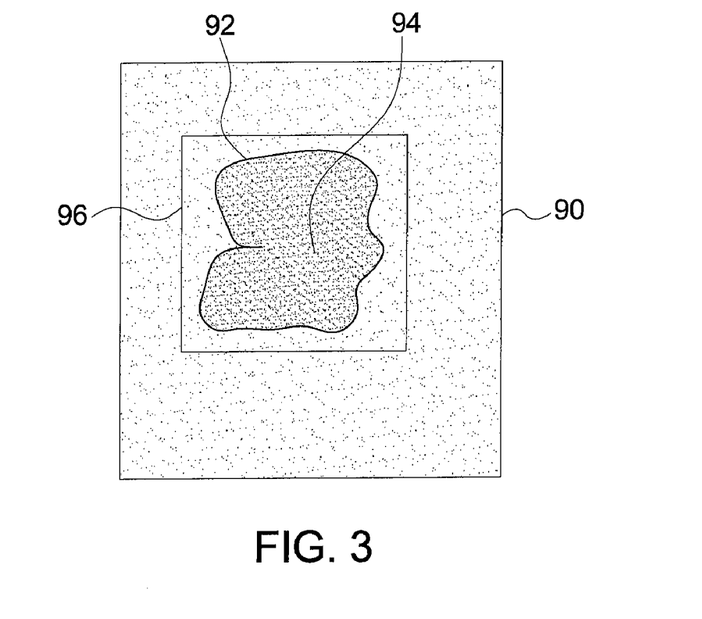
FIG. 3 is a diagrammatic representation of an exemplary positron emission tomography (PET) image.

In step 80, a user selects a seed within the lesion displayed in the PET image. In another embodiment, the seed is selected automatically by using appropriate image processing algorithms. As used herein, a seed refers to any point the user chooses, within the area that represents the lesion in the image. FIG. 3 is a diagrammatic view of an exemplary PET image. A portion of PET image 90 is characterized by a lesion 92. The user selects a seed 94 within the lesion 92. In a further embodiment, the user also creates a bounding box 96 around the seed 92. In the illustrated embodiment, the bounding box is in the form of a rectangle, however the bounding box may also be of other shapes.

Continuing with FIG. 2, in step 82, a directionally dependent statistical model of the data corresponding to the image is derived to identify a background region in the image. In one embodiment, the statistical model is derived by resampling pixel data corresponding to the lesion in spherical coordinates and deriving a piece wise approximation of the image intensity along a radial direction extending from the seed. The manner in which the directionally dependent statistical model is derived is described in further detail with reference to FIG. 3.

Continuing with FIG. 2, in step 84, candidate voxels along a radial direction from the selected seed is determined. The candidate voxels represent the lesion. The candidate voxels for the lesions along the radial lines are chosen based on the local statistics of the background voxels.

Figure 4:
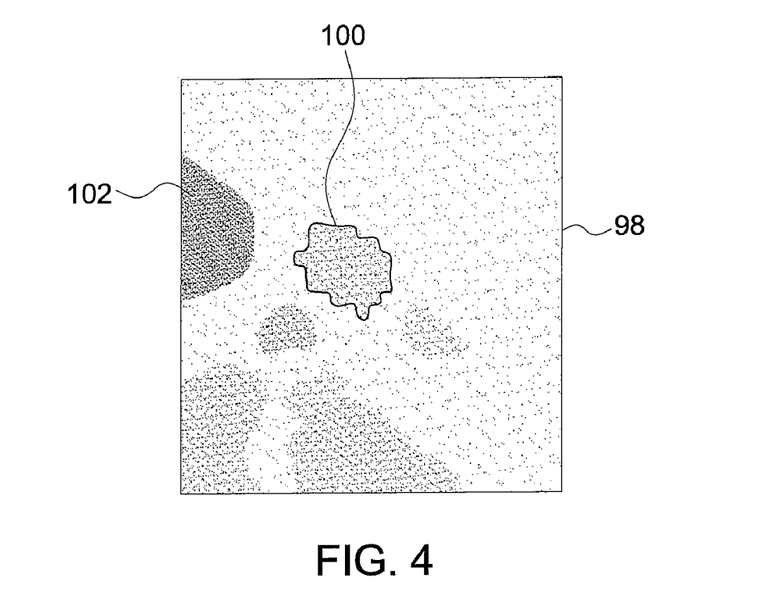
FIG. 4, FIG. 5 and FIG. 6 are exemplary PET images on which the direction dependent statistical model is applied.
Figure 5:
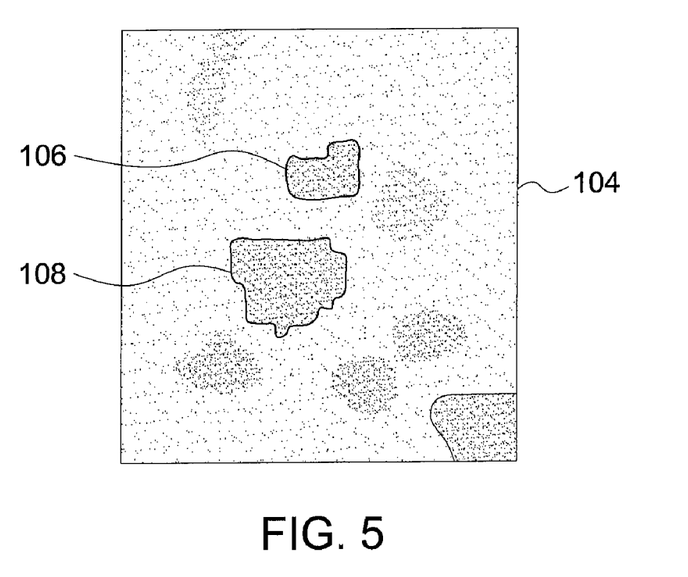
Figure 6:
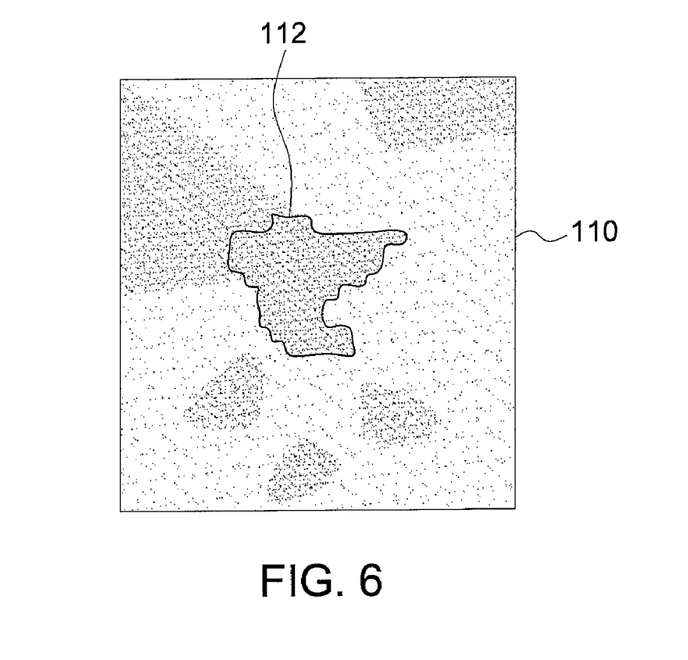

In step 86, the lesion is segmented using the candidate voxels. In one embodiment, the lesion boundary is determined. One advantage of applying the directionally dependent statistical model is that lesions that are located close to a region of high uptake (e.g., the liver) can be determined accurately. FIG. 4 is an exemplary PET image 98 illustrating a lesion 100 located next to the liver 102. Another advantage of applying the direction dependent statistical model is that lesions 106 and 108 with complex topologies can also be identified as shown in PET image 104 of FIG. 5. Referring to FIG. 6, yet another advantage of applying the direction dependent statistical model is that lesions 112, which are inhomogeneous and with relatively poor contrast as shown in the PET image of 110 of FIG. 6, can also be identified.

As described with reference to step 82 of FIG. 2, the directionally dependent statistical model is derived from a piece wise approximation of the image. The piece wise approximation is created by using a mean shift algorithm.

Figure 7:
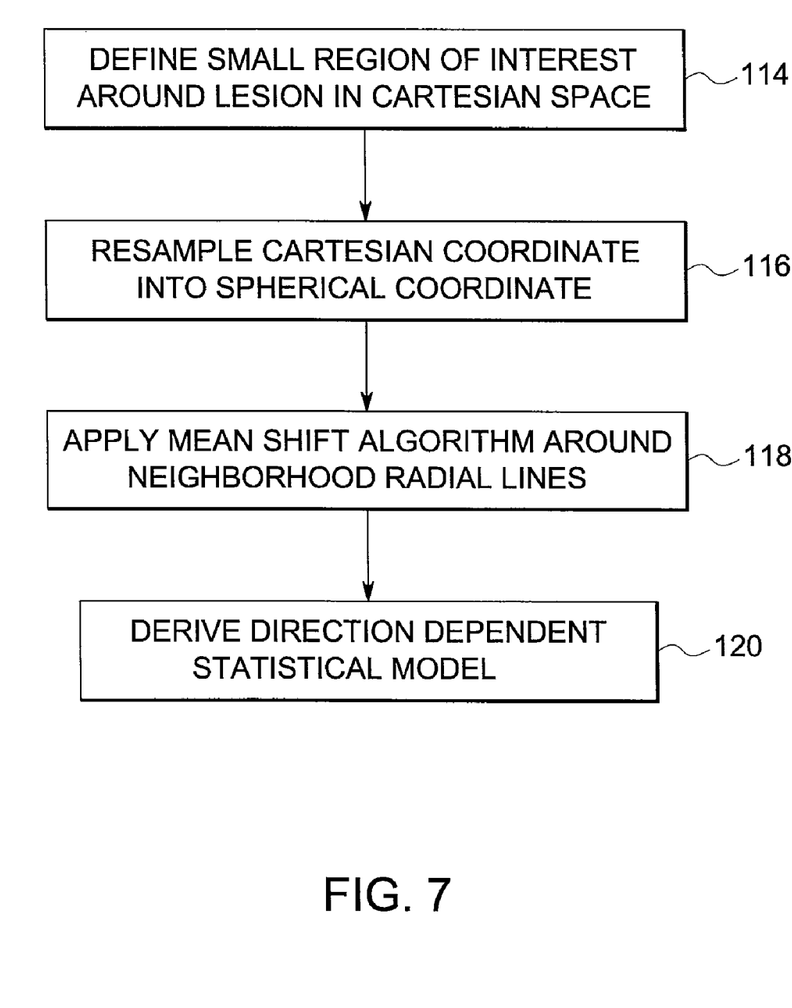
FIG. 7 is a flow chart illustrating a method for deriving the direction dependent statistical model.

The manner in which the mean shift algorithm is used to create the piece wise approximation model is described with reference to FIG. 7. FIG. 7 is a flow chart illustrating one method by which the direction dependent statistical model is derived. Each step is described in further detail below.

In step 114, a small region of interest around the lesion is defined in Cartesian coordinates. In one embodiment, the region of interest is greater than the area of the lesion. In a further embodiment, the region of interest is about three times the size of the lesion.

In step 116, the imagery in the region of interest is resampled into spherical coordinates. For example, a point in the lesion (x, y, z) in Cartesian coordinates is represented in spherical coordinates in terms of its radial distance to origin 'r', azimuthal angle in the xy-plane 'θ', and polar angle from the z-axis 'Φ'. Hence, x=r cos θ sin Φ, y=r sin θ cos Φ and z=cos Φ where r=[0 ,∞], θ=[0, 2π], Φ=[−π, +π]. In one embodiment, the resampled data in spherical coordinates is represented in a three-dimensional matrix with r, θ and Φ as the dimensions. The process of resampling data in spherical coordinates and representing in a 3D matrix is frequently referred to in the art as lesion unwrapping.

In step 118, the mean shift algorithm is applied on the spherical coordinates of the lesion along each radial line in the unwrapped lesion. In a further embodiment, the mean shift algorithm is applied on the spherical coordinates of the lesion along a neighborhood of radial lines in the unwrapped lesion. By applying the mean shift algorithm along the radial lines, a piecewise constant approximation is obtained.

As is well known in the art, the mean shift algorithm is used to estimate the gradient of a probability density function for a given set of samples from the distribution. The mean shift algorithm is applied along each radial line to obtain a piece wise constant approximation of the image intensity along each radial direction. In a specific embodiment, the mean shift algorithm is simultaneously applied over a neighborhood of radial lines. The 3D matrix representation of the spherical coordinates allows the incorporation of neighborhood constraints while applying the mean shift algorithm.

In step 120, a direction dependent statistical model of the background is derived by using the spherical mean shift algorithm. The algorithm can be applied even if there is significant variation in the background on different sides of the lesion. For example, a lesion that is adjacent to high-uptake regions such as heart or mediastinum has higher background levels to one side. The variation is addressed by estimating a different statistical model for the background in each radial direction.

In another embodiment, the mean-shift algorithm is applied to the image data in Cartesian space to create a three-dimensional piece-wise constant model of tumor. Next the three-dimensional piece constant model is converted to spherical co-ordinate system as described instep 116, to generate radial line representation of the lesion from seed point.

The background model for each radial line is based on a neighborhood of radial lines. In one embodiment, voxels are identified that are associated with the segment with the lowest intensity in the initial spherical mean shift segmentation. In one embodiment, estimate of the minimum is obtained by not considering small regions in this step. The statistical model of the background in the given radial direction is estimated from the PET image intensity values of the candidate voxels. In one specific mode, a simple statistical model composed of the sample mean $\mu_b$ and the standard deviation $\sigma_b$ is used. All voxels within $\mu_b \pm k^* \sigma_b$ where k is a real valued constant, are assigned to the background and the remaining voxels are assigned to the lesion. Other embodiments include but are not limited to robust estimates of means, standard deviations and regressions. By repeating this process on all radial lines, the lesion is segmented in spherical coordinates. Finally, the segmented image is sampled back into Cartesian coordinates using nearest neighbor interpolation.

The above described invention has many advantages including the ability of the algorithm to segment lesions that are adjacent to regions of high uptake like the liver, mediastinum, heart, etc. In addition, the segmentation method is capable of segmenting lesions in an image with poor contrast and/or diffused boundaries. The segmentation method can also segment lesion with complex shapes and necrotic cores. The method is robust to placement of the seed, the dimension of the bounding box and the dynamic range of the image data.

While only certain features of the invention have been illustrated and described herein, many modifications and changes will occur to those skilled in the art. It is, therefore, to be understood that the appended claims are intended to cover all such modifications and changes as fall within the true spirit of the invention.

The invention claimed is:

1. A method for segmenting a structure in an image, the method comprising:
   selecting one seed inside the structure, wherein the selecting is performed by a user;
   using a processor to derive a directionally dependent statistical model corresponding to the image to identify an area relative to the structure in the image, wherein the step of deriving comprises:
      resampling data corresponding to the structure in spherical coordinates;
      deriving a piece wise approximation using a mean shift algorithm of the image intensity along a radial direction extending from the seed;
   determining candidate voxels along a radial direction from a location of the seed, wherein the candidate voxels represent the structure; and
   segmenting the structure using the candidate voxels.

2. The method of claim 1, wherein the step of deriving comprises deriving the directionally dependent statistical model based on a foreground of the structure, a background of the structure or combinations thereof.

3. The method of claim 1, wherein the step of deriving comprises deriving a respective statistical model for each radial direction.

4. The method of claim 3, wherein a radial direction comprises a neighborhood of radial lines along each radial direction.

5. The method of claim 1, wherein the step of segmenting further comprises mapping the candidate voxels to a Cartesian coordinate space.

6. The method of claim 1, wherein the step of segmenting further comprises identifying the voxels corresponding to the seed selected by the user.

7. The method of claim 1, wherein the step of selecting further comprises applying a bounding box around the seed.

8. The method of claim 7, wherein the bounding box encloses the structure.

9. The method of claim 1, wherein the step of segmenting comprises determining boundaries of the structure.

10. The method of claim 1, wherein the image is a two-dimensional image or a three-dimensional image.

11. The method of claim 1, wherein the structure represents a lesion.

12. The method of claim 1, wherein the image comprises at least one of a positron emission tomography (PET) image, a computed tomography image, a single photon emission computed tomography image, magnetic resonance image, digital radiography image or microscopy images.

13. An imaging system for segmenting structures in an image, the system comprising:
   a user interface for enabling a user to select a seed inside the structure;
   an image processor adapted to implement an image processing algorithm configured to:
      derive a directionally dependent statistical model of the image to identify a region relative to the structure in the image;
      resample data corresponding to the structure in spherical coordinates;
      derive a piece wise approximation using a mean shift algorithm of the image intensity along a radial direction extending from the seed;
      determine candidate voxels along a radial direction from location of the seed, wherein the candidate voxels represent the structure; and
      segment the structure using the candidate voxels.

14. The imaging system of claim 13, wherein the image processor is configured to derive the directionally dependent statistical model based on a foreground of the structure, a background of the structure or combinations thereof.

15. The imaging system of claim 13, wherein the image processor is configured to derive a respective statistical model for each radial direction.

16. The imaging system of claim 13, wherein the image processor is further configured to map the candidate voxels to a Cartesian coordinate space.

17. The imaging system of claim 13, wherein the image processor is configured to identifying the voxels corresponding to the seed selected by the user.

18. The imaging system of claim 13, wherein user interface is further configured to enable a user to apply a bounding box around the seed.

19. The imaging system of claim 13, wherein image processor is further configured to determine boundaries of the structure.

20. The imaging system of claim 13, wherein the image processing algorithm is applied to an image of varying contrast.

21. The imaging system of claim 13, wherein the image processing algorithm is applied to an image of varying intensity.

22. An imaging system for segmenting structures in an image, the system comprising:
- an image processor adapted to implement an image processing algorithm configured to:
- automatically select a seed inside the structure;
- derive a directionally dependent statistical model of the image to identify a region relative to the structure in the image;
- resample data corresponding to the structure in spherical coordinates;
- derive a piece wise approximation using a mean shift algorithm of the image intensity along a radial direction extending from the seed;
- determine candidate voxels along a radial direction from location of the seed, wherein the candidate voxels represent the structure; and
- segment the structure using the candidate voxels.

23. The imaging system of claim 22, wherein the image processor is configured to derive the directionally dependent statistical model based on a foreground of the structure, a background of the structure or combinations thereof.

24. The imaging system of claim 22, wherein image processor is further configured apply a bounding box around the seed.

25. The imaging system of claim 22, wherein image processor is further configured to determine boundaries of the structure.

26. An imaging system for segmenting structures in an image, the system comprising:
- means for selecting one seed inside the structure; wherein the selecting is performed by a user;
- means for deriving a directionally dependent statistical model of the image to identify a background region in the image, wherein the means for deriving comprises:
  - resampling data corresponding to the structure in spherical coordinates;
  - deriving a piece wise approximation using a mean shift algorithm of the image intensity along a radial direction extending from the seed;
- means for determining candidate voxels along a radial direction from location of the seed, wherein the candidate voxels represent the structure; and
- means for segmenting the structure using the candidate voxels.

* * * * *